Feb. 20, 1923.
F. W. STERLING.
AUTOMOBILE ATTACHMENT.
FILED JAN. 24, 1921.
1,445,918.
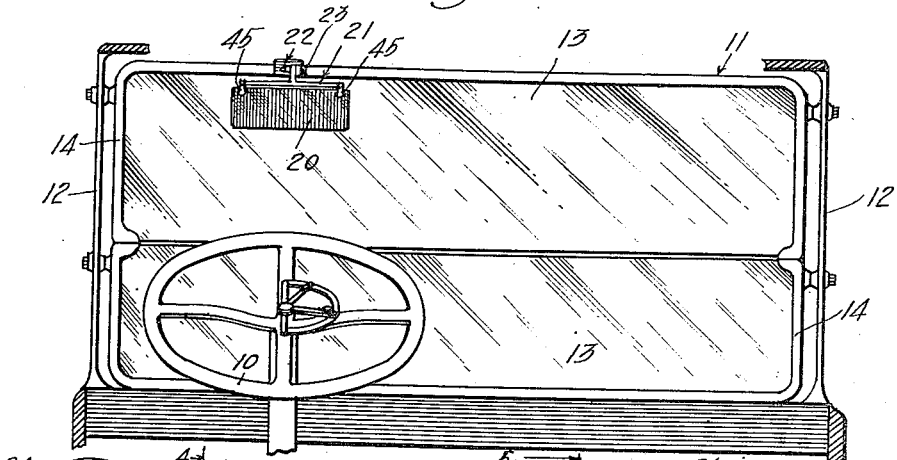
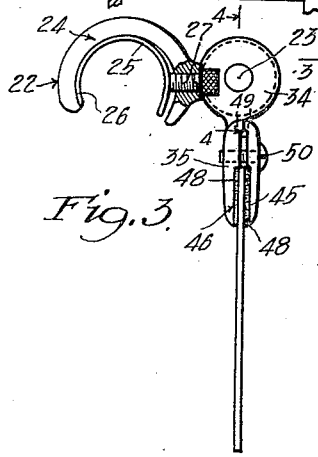
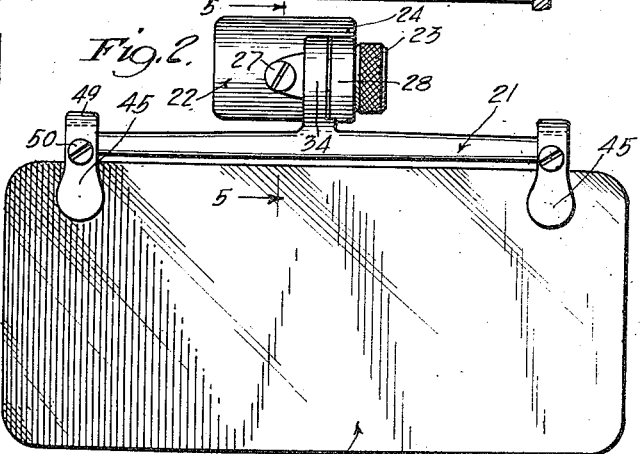
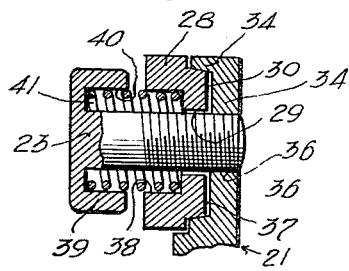
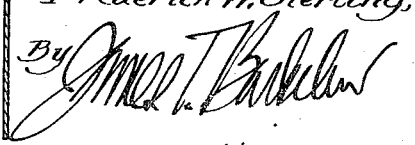
Inventor:
Frederick W. Sterling, Patented Feb. 20, 1923.

1,445,918

UNITED STATES PATENT OFFICE.

FREDERICK W. STERLING, OF LOS ANGELES, CALIFORNIA, ASSIGNOR, BY MESNE ASSIGNMENTS, TO B. H. DYER COMPANY, A CORPORATION OF DELAWARE.

AUTOMOBILE ATTACHMENT.

Application filed January 24, 1921. Serial No. 439,419.

*To all whom it may concern:*

Be it known that I, FREDERICK W. STERLING, a citizen of the United States, residing at Los Angeles, in the county of Los Angeles, State of California, have invented certain new and useful Improvements in Automobile Attachments, of which the following is a specification.

This invention has to do with an automobile attachment adapted to be mounted on an automobile windshield to protect the driver against the glare of light from oncoming vehicles, or like glares, such as might impair his vision and thus inconvenience and possibly endanger him. An object of the invention is to provide a simple, neat and convenient device of this character which is effective and desirable for use.

The driver of an automobile is frequently bothered and annoyed by the glare of lights from oncoming vehicles, by the reflection of the sun on the pavement, and not infrequently by the sun itself. To overcome the annoying and blinding of motorists by the glare of vehicle lights numerous dimmers, lenses, etc., have been proposed and used on the lights. Such manners of overcoming the difficulty have not been overly satisfactory as the lights are either dimmed so that they are not effective or are blinding under certain circumstances.

The present invention provides a device to be used by a motorist to protect himself against the lights of oncoming vehicles whether they are strong or weak. Further, the device is conveniently controllable by the motorist so that he can use it or not as he wishes. A motorist equipped with the device is not dependent upon the diligence of other motorists in dimming their lights but is sure that he will not be inconvenienced or blinded under any circumstances.

A particular feature of the invention is the construction of the device which allows it to be easily and conveniently adjusted by the motorist and yet causes it to stay in any set position. The joint at which the adjustment takes place is strong and effective and is also neat and sightly.

The objects and features of the invention will be best and more fully understood from the following detailed description of a preferred form of the invention through which reference is had to the accompanying drawings in which—

Fig. 1 is a view of the device mounted on a typical automobile windshield showing the device and windshield viewed as by an occupant of the vehicle on which the windshield is mounted; Fig. 2 is an enlarged face view of the device; Fig. 3 is an end view of the device being a view on the line 3—3 on Fig. 2; Fig. 4 is an enlarged sectional view taken as indicated by line 4—4 on Fig. 3; and Fig. 5 is an enlarged sectional view taken as indicated by line 5—5 on Fig. 2.

Throughout the drawings numeral 10 designates the steering wheel of a typical automobile arranged in the usual manner in front of the driver's seat. A windshield 11 is supported in front of steering wheel 10 by standards 12 and comprises, generally, glass panels 13 provided with enameled metal frames 14. The particular windshield shown in the drawings is of standard design and construction and is intended only to illustrate the general character of structure on which the device of the present invention may be mounted.

The device of the present invention comprises, generally, a panel 20, a bracket 21, which supports or carries the panel 20, and a bracket 22 by which the bracket 21 is mounted on the frame 14 of a windshield panel. The brackets 21 and 22 are pivotally connected by a screw 23 so that the bracket 22 may be firmly set on the frame 14 and allow the bracket 21 and panel 20 to be adjusted or moved to various positions.

The bracket 22 is preferably a casting with a clamp like body portion 24 adapted to fit over or embrace the frame 14 at the upper edge of a windshield panel 13. In practice the body 24 of the bracket 22 may be shaped to fit any particular frame 14 and need not be exactly as it is illustrated in the drawings. In accordance with the present invention a sheet metal liner 25 is provided in the body 24. The liner 25 is welded, soldered, or otherwise secured, to one edge or side of the body 24, as at 26, having its other parts extending freely around in the body 24, as clearly shown in Fig. 3 of the drawings. A set screw 27 is carried in the side of the body 24 opposite to that to which the liner 26 is connected and is adapted to engage the outer side surface of the liner 25. When the body 24 is placed over or on a frame 14 the set screw 27 may be tightened or adjusted to firmly and solidly clamp the liner 25 onto the frame 14. It will be readily understood how the body 24 can be placed on frames 14 of various sizes and yet be firmly and solidly set by the set screw 27 because of the liner 25 being secured only at one edge 26 and being free to be forced into engagement with a frame 14. By the provision of the liner 25 the frame 14 is not marred or defaced in any way by the screw 27 when setting the bracket 22 on it. It will be obvious how the frame 14 would be scratched and marred if it were not for the liner 25. At one end the body 24 is formed with a round projection 28 through which there is a transverse control bore 29. At the inner face of the projection 28 and concentrically with the bore 29 there is an outwardly tapering extension 30. At the outer face of the projection 28 and concentrically with the bore 29 there is a recess.

The bracket 21 is preferably a cast member and comprises a horizontal arm from the center of which extends a round projection 34 and from each end of which extends a clamp jaw 35. The projection 34 is the same size as the projection 28, and is formed with a control screw-threaded bore 36 to correspond or register with the bore 29 in the projection 28, and is formed at its inner face with a round tapered recess or socket 37 adapted to receive the extension 30 on the inner face of projection 28. The pivot bolt 23 extends through the bore 29 from the outer side of the projection 28 and screwthreads into the bore 36 in the projection 34. The head 39 of the bolt 23 is formed at its inner face with a recess 40. A compression spring 41 is carried on the bolt 23 and extends into the recess in the outer face of projection 28 and the recess 40 in the inner face of the head of bolt 23, in the manner clearly shown in Fig. 4 of the drawings. The various parts are formed and proportioned so that the only contact between projections 28 and 34 is the seating of the extension 30 in the recess or socket 37. With the construction just described tightening of the bolt 23 in the bore 36 causes the extension 30 to be yieldingly forced into the socket 37. By the provision of the recesses in the projection 28 and bolt head 39, respectively, the spring 41 may be of considerable length thus making it possible to set the bolt 23 so that the extension 30 is yieldingly held in the socket 37 with any desired pressure. Further, with the construction provided by the invention the bolt 23 can be tightened in the bore 36 until the head 39 seats against the outer face of the projection 28 whereupon the extension 30 is no longer yieldingly held in the socket 37 but is positively held or forced into it.

The clamp jaws 35 are each adapted to co-operate with a loose clamp jaw 45 to support or hold the panel 20. The jaws 35 and 45 are each formed at one end with recesses 46 to carry pads 48, and are each formed at the other end with inwardly extending lugs 49. The jaws 35 and 45 are adapted to be held or clamped together by a screw 50 which connects them at a point between the recesses 46 and lugs 49. The panel 20 is adapted to extend between the recessed end portions of the jaws 35 and 45 and to be engaged only by the pads 48. In practice the pads may be any suitable material, say for instance felt, rubber, or the like. With the clamp jaws 35 and 40 contacting only at the ends farthest remote from the parts which clamp the panel 20 it is possible to tighten the screw 50 to positively and firmly clamp and hold the panel 20.

The panel 20 is preferably formed of colored glass, or the like. In practice the glass of the panel is colored sufficiently to dim the glare of ordinary automobile headlights and yet not sufficiently to prevent a person seeing ordinary objects through it. Although it is obvious that various colors of glass may be used it may be stated that it has been found that blue, green, or brown glass is very effective. Further, it will be understood that the exact shade or amount of color in the glass may be varied under various circumstances or conditions. For instance, it may be found that one person will need a comparatively dark or heavily colored panel to properly dim ordinary lights while another will require only a lightly tinted panel. It will also be obvious that a panel 20 of any desired size may be carried in the bracket 21. In some cases it may be necessary that the panel 20 be considerably larger or of different proportions than in another.

In the use of the device it is firmly and solidly mounted on the frame 14 at the upper edge of the upper windshield panel 13 directly in front of the driver's seat. The device is mounted as hereinbefore described by arranging the body 24 over the frame 14 and tightening the set screw 27 to clamp the liner 25 onto the frame 14. The bolt 23 is set or adjusted so that the bracket 21 and therefore the panel 20 may be moved or adjusted by hand and yet not be moved by the vibration or jarring of the machine. When there is no occasion for using the device the panel is moved to a horizontal position or to a position where it is up and out of the way. When it is desired to use the device, that is, when driving at night or when the glare of the sun or pavement is obnoxious, the panel 20 is moved downwardly to a position where it shields the driver's eyes. In some cases and under certain circumstances it is necessary to move the shield to a vertical position or where it is completely down while under other circumstances or in other cases it is necessary to move the shield only partially down. It is most desirable in practice to move the shield downwardly only enough to shield the driver's eyes as it will then interfere only a minimum amount with the driver's vision. The device being arranged immediately in front of the driver and being adjusted so that the panel can be easily and conveniently moved by hand it is an extremely simple and convenient operation to set or adjust the panel 20 to the desired position. In fact, the panel 20 can be adjusted by the driver while he is driving and without in any way effecting his control of the machine. As heretofore stated the panel 20 is of such material, preferably colored glass, that it will shield the driver's eyes against the glare of ordinary head lights, etc., and yet not prevent him from seeing objects through it. When I say colored or tinted glass I mean, of course, any material or composition of materials possessing the general characteristics of colored or tinted glass, or further any material coated or treated to have the general characteristic of colored or tinted glass.

Having described only a preferred embodiment of my invention I do not wish to limit or restrict myself to the particular details hereinabove set forth but wish to reserve to myself any changes or variations that may appear to those skilled in the art or that may fall within the scope of the following claims.

Having described a preferred form of my invention, I claim:

1. A device of the character described comprising a panel, a bracket supporting the panel, by engaging it at spaced points, a second bracket having a body part adapted to fit over a windshield frame, a liner in said body part secured only at one edge of the body part, a set screw in the body to engage a free portion of the liner, one of the brackets having a recess in it, one of the brackets having a socket in it, a projection on the other bracket adapted to seat in the socket, and means for yieldingly pivotally connecting the brackets, said means comprising a screw arranged to pivotally connect the brackets the screw having a recess in its head, and a spring arranged around the screw to extend into said recesses in the screw and bracket and yieldingly hold the brackets together with the projection seated in the socket, the seating of the projection in the socket being the only contacting of the brackets.

2. A device of the character described comprising a panel, a bracket connected to the panel, a second bracket adapted to be supported on a windshield frame, one of said brackets having a projection and the other a socket receiving and surrounding said projection, a screw extending through the projection and socket and engaging one of the brackets, and a spring surrounding the screw between the head thereof and the other adjacent bracket and exerting pressure to maintain contact between said projection and the surrounding wall of the socket.

3. A device of the character described comprising a panel, a bracket connected to the panel, a second bracket adapted to be supported on a windshield frame, one of said brackets having a projection and the other a socket receiving and surrounding said projection, and one of the brackets having in its outer face a recess coaxial with said projection and socket, a screw extending through the recess, projection and socket into engagement with one of the brackets and having an annular recess formed in the inner face of its head, and a coiled spring surrounding the screw between its head and the adjacent bracket and having its ends seated in said recesses.

In witness that I claim the foregoing I have hereunto subscribed my name this 17th day of January, 1921.

FREDERICK W. STERLING.

Witness:
VIRGINIA BERINGER.